(12) United States Patent
Eriksson

(10) Patent No.: US 12,276,960 B2
(45) Date of Patent: Apr. 15, 2025

(54) METHOD AND MULTIBODY SYSTEM FOR SUPERVISION OF A JOINT

(71) Applicant: DELAVAL HOLDING AB, Tumba (SE)

(72) Inventor: Andreas Eriksson, Tumba (SE)

(73) Assignee: DeLaval Holding AB, Tumba (SE)

( * ) Notice: Subject to any disclaimer, the term of this patent is extended or adjusted under 35 U.S.C. 154(b) by 370 days.

(21) Appl. No.: 17/787,208

(22) PCT Filed: Dec. 10, 2020

(86) PCT No.: PCT/SE2020/051196
§ 371 (c)(1),
(2) Date: Jun. 17, 2022

(87) PCT Pub. No.: WO2021/126051
PCT Pub. Date: Jun. 24, 2021

(65) Prior Publication Data
US 2023/0033156 A1    Feb. 2, 2023

(30) Foreign Application Priority Data
Dec. 19, 2019    (SE) .................................. 1951504-8

(51) Int. Cl.
*G05B 19/19*    (2006.01)
*A01J 5/007*    (2006.01)
*A01J 5/017*    (2006.01)

(52) U.S. Cl.
CPC .............. *G05B 19/19* (2013.01); *A01J 5/007* (2013.01); *A01J 5/0175* (2013.01); *G05B 2219/39527* (2013.01); *G05B 2219/45113* (2013.01)

(58) Field of Classification Search
CPC .......... G05B 19/19; G05B 2219/39527; G05B 2219/45113; A01J 5/007; A01J 5/0175; G06T 7/73
See application file for complete search history.

(56) References Cited

U.S. PATENT DOCUMENTS

| 5,579,444 A | 11/1996 | Dalziel et al. |
| 2015/0158181 A1 | 6/2015 | Kawamura et al. |

(Continued)

FOREIGN PATENT DOCUMENTS

| CN | 110238845 | 9/2019 |
| EP | 1 574 300 | 9/2005 |

(Continued)

OTHER PUBLICATIONS

Xiaoying Sun, et al., "A Review of Robot Control with Visual Servoing", 2018 IEEE 8th Annual International Conference on CYBER Technology in Automation, Control, and Intelligent Systems (CYBER), IEEE, Jul. 19-23, 2018, 6 pages.

(Continued)

*Primary Examiner* — Siamak Harandi
*Assistant Examiner* — Andrew S Budisalich
(74) *Attorney, Agent, or Firm* — NIXON & VANDERHYE

(57) ABSTRACT

A method for use with a multibody system includes two body sections assembled via a joint, one of the body sections including a camera which is moveable between a first position and a second position, includes detecting a reference object with the camera situated in the first position, determining a reference value of the reference object, requesting movement of the camera from the first position into the second position, initiating movement of the camera from the first position towards the second position, while iteratively sampling image of the reference object, deter- (Continued)

mining a current object value of the reference object, based on the sampled image, matching the reference value with the current object value, and determining successfulness of the camera movement, based on the matching.

19 Claims, 9 Drawing Sheets

(56) References Cited

U.S. PATENT DOCUMENTS

| | | | |
|---|---|---|---|
| 2015/0237308 A1 | 8/2015 | Tanaka et al. | |
| 2015/0366155 A1 | 12/2015 | Hofman et al. | |
| 2016/0364612 A1* | 12/2016 | Dixon | G06V 20/52 |
| 2016/0364867 A1* | 12/2016 | Moteki | G06T 7/73 |
| 2017/0032311 A1* | 2/2017 | Rizzolo | G06V 10/25 |
| 2021/0192770 A1* | 6/2021 | Short | G06T 7/70 |

FOREIGN PATENT DOCUMENTS

| | | |
|---|---|---|
| EP | 2 722 136 | 4/2014 |
| GB | 2580690 | 7/2020 |
| WO | 89/01850 | 3/1989 |
| WO | 2007/008940 | 1/2007 |
| WO | 2018/053430 | 3/2018 |

OTHER PUBLICATIONS

Search Report for SE Application No. 1951504-8 dated Sep. 28, 2020, 3 pages.
International Search Report for PCT/SE2020/051196 dated Mar. 9, 2021, 3 pages.
Written Opinion of the ISA for PCT/SE2020/051196 dated Mar. 9, 2021, 6 pages.

* cited by examiner

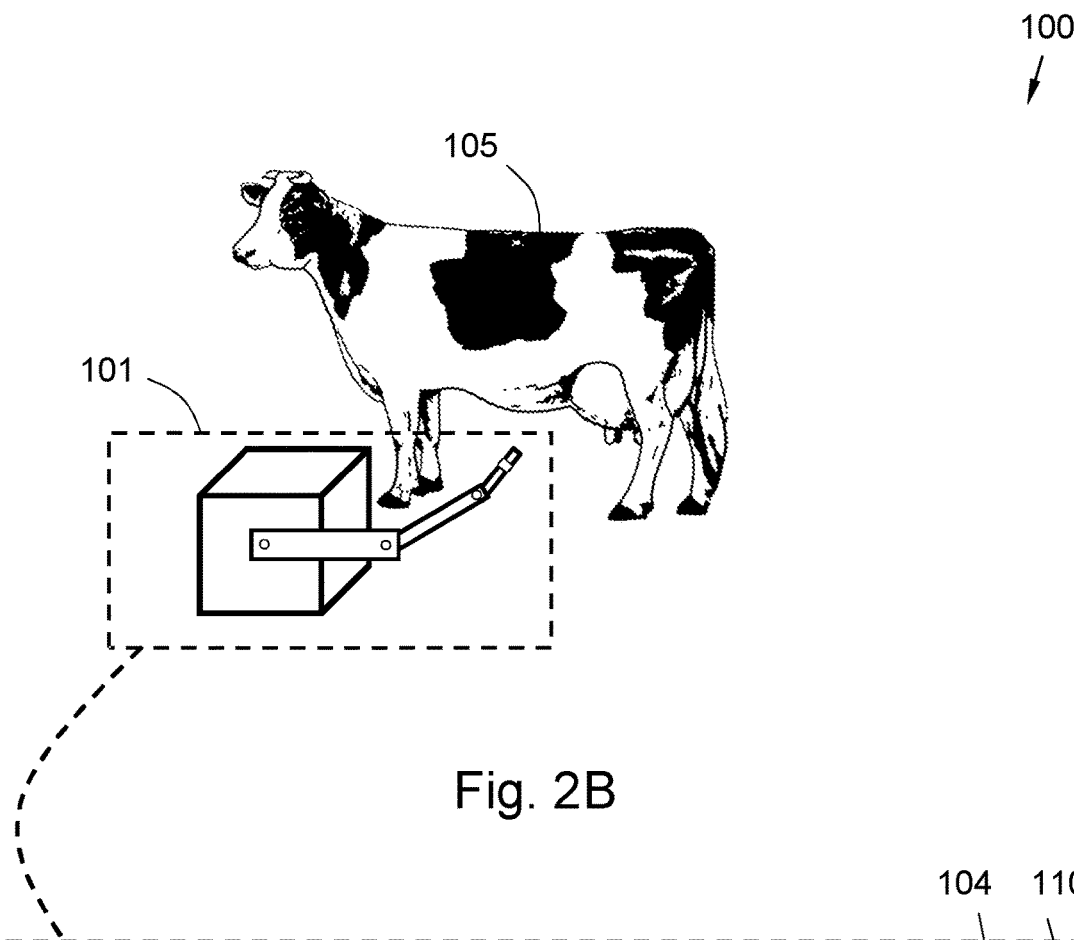
Fig. 2B
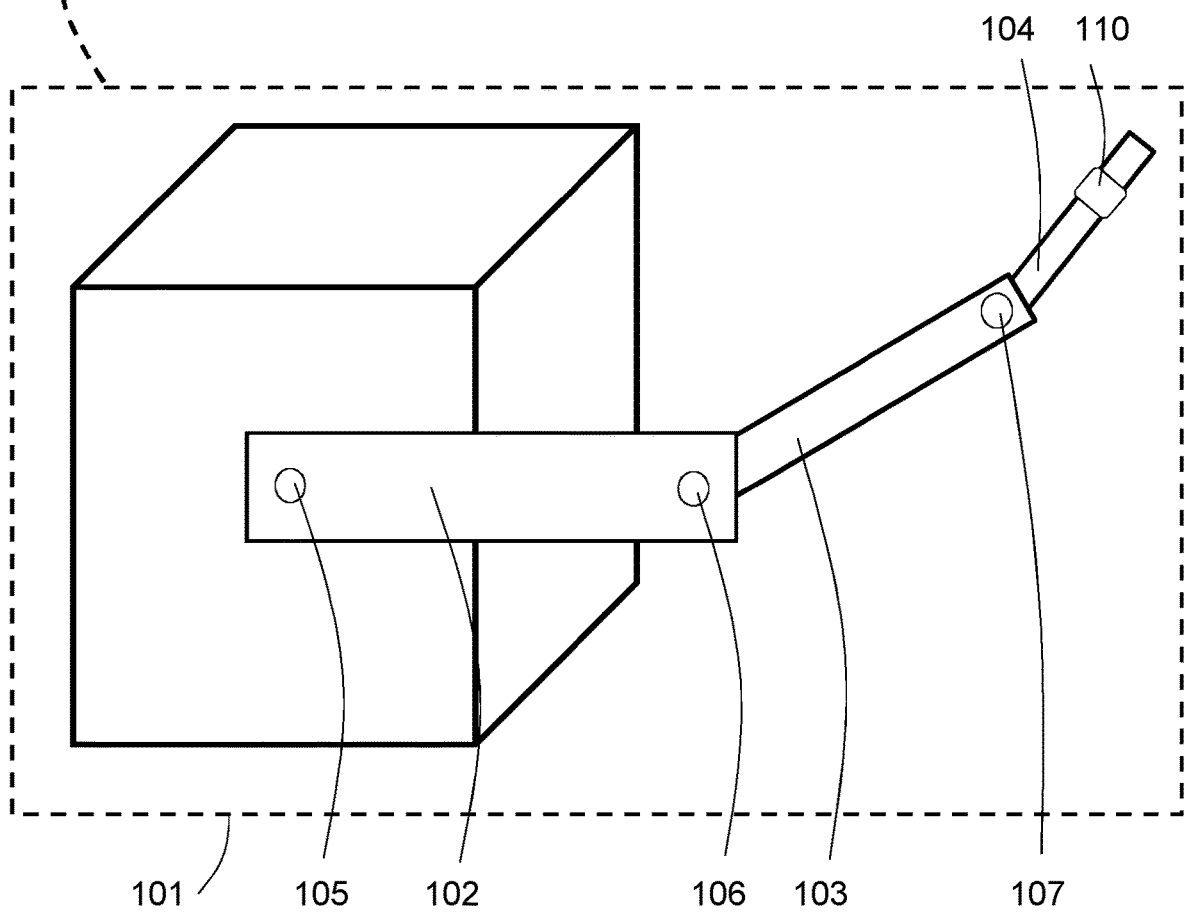

ial Application No. 1951504-8 filed Dec. 19, 2019, the entire contents of each of which are hereby incorporated by reference.

TECHNICAL FIELD

This document discloses a method and a multibody system. More particularly, a method and a multibody system are described, for supervision of functionality of a joint in the multibody system.

BACKGROUND

Some machines with moving parts, (autonomous) vehicles, and/or robots may operate without human supervision, or at least without continuous human supervision. This may be the case, not the least for machines working in rough or dusty environments such as in mines, underground, in traffic, in agricultural environments, etc.

These kinds of machines with moving parts/body sections such as for example robots, may be referred to as multibody systems. A multibody system comprises at least two body sections assembled via a joint, wherein the two body sections could move in relation to each other via the joint.

A problem with these kinds of machines intended to operate without continuous supervision is to know whether the machine is working properly or is malfunctioning due to some unexpected event. Another problem is to predict when it is time to perform service/maintenance.

These problems may be in particular severe for a machine operating in an agricultural environment, for example a milking robot, as the milking robot is operating among living creatures, which may cause unexpected problems as the animal may hit or otherwise affect the machine.

It would be desired to develop a solution to these problems related to multibody systems with moving sections.

SUMMARY

It is therefore an object of the herein disclosed embodiments to supervise a movement of a multibody system and detect malfunction of the multibody system.

According to a first aspect, this objective is achieved by a method of a multibody system comprising two body sections assembled via a joint, wherein one of the body sections comprises a camera which is moveable between a first position and a second position. The method comprises detecting a reference object with the camera situated in the first position. Further, the method comprises determining a reference value of the reference object. The method in addition comprises requesting movement of the camera from the first position into the second position. The method also comprises initiating movement of the camera from the first position towards the second position. During the movement, a continuous iteration of actions is made, such as sampling images of the reference object, determining a current object value of the reference object, based on the sampled image, and matching the determined reference value with the current object value. The method also comprises determining successfulness of the requested movement of the camera from the first position into the second position, based on the matching.

Hereby, the functionality of the moving sections of the multibody system is monitored, and it could be ascertained that the moving sections are either operating as expected or require maintenance/human inspection. Some indications of requirement for human inspection/maintenance may be when the comparison result in that no movement at all is detected, or when the camera never arrives at the second position due to for example dirt or an intervening obstacle.

In a first possible implementation of the method according to the first aspect, the method additionally may comprise determining status of the multibody system, based on the determined successfulness of the camera movement. The method may furthermore comprise outputting the determined status.

The status may be output to the user for example a colour code (green/yellow/red), a grading between e.g. 1-10, a happy/sad/panicking/angry avatar for example in some arbitrary embodiments. Hereby the user immediately understands the status of the multibody system and may take appropriate measures.

The status output may also, or alternatively in embodiment wherein time of the movement has been measured and compared with a reference value, comprise an estimated time to the proximate maintenance occasion. Hereby, service and maintenance measures may be performed when a delay over time has been detected.

In a second possible implementation of the method according to the first aspect, or the first implementation thereof, the method may comprise measuring time of the camera movement from the first position into the second position. The method further may comprise comparing the measured time with a reference time limit. In addition, the method also may comprise triggering a maintenance measure when the measured time exceeds the reference time by a threshold limit.

By measuring the time for completing the movement into the second position, and compare it with the reference value, a delay over time is detected and based there upon, wear (of bearings and other similar moving parts/sections) over time may be suspected and a service measure may be triggered such as lubrication and/or replacement at an optimal moment in time. Hereby, safety is enhanced as mechanical failures of the multibody system due to wear could be avoided. Emergency stops and delays are avoided or at least reduced.

In a third possible implementation of the method according to the first aspect, or any implementation thereof, the method may also comprise determining a successfulness rate of the camera movement, based on stored determined successfulness of the camera movement.

The method may also comprise comparing the determined successfulness rate with a reference value. In addition, the method also may comprise triggering a maintenance measure when the determined successfulness rate is lower than the reference value.

Thanks to the disclosed solution, the farmer/operator could diagnose and identify mechanical sections of the multibody system with high running resistance and thereby enable replacement or service maintenance measures of them.

In a fourth possible implementation of the method according to the first aspect, or any implementation thereof, the determined reference value of the reference object may comprise a reference vector between a reference point of the multibody system and the position of the reference object with the camera situated in the first position. Also, the determined current object value of the reference object, may be based on the sampled image comprises an object vector between the reference point of the multibody system and the reference object in the sampled image. The matching may be made by a length comparison between the reference vector and the object vector.

By calculating the reference vector and the object vectors respectively, and using them for the matching, an easily implemented methodology is provided.

In a fifth possible implementation of the method according to the fourth implementation of the first aspect, the method may also comprise estimating an angle between the reference vector and the object vector. Also, the movement of the camera from the first position into the second position may be determined to be successful when the estimated angle between the determined reference vector and the determined object vector is approximately zero; or unsuccessful when the estimated angle between the determined reference vector and the determined object vector is different from zero in addition to a reference limit; or unconfirmed, otherwise.

By calculating reference vector and the object vectors respectively and calculating an angle between them during the movement of the body section and the camera, the progress of the movement may be followed and for example be plotted in a diagram, whereby analysis of the movement may be made.

In a sixth possible implementation of the method according to the first aspect, or any of the first, second or third implementations thereof, the determined reference value of the reference object and the current object value of the reference object comprises coordinates, defining the position of the reference object.

By determining coordinates of the reference object for reference value and comparing it with the current object coordinates during the movement of the camera, a reliable method for determining whether the movement has been successfully terminated is provided. The coordinates may be absolute, or relative for example in relation to the camera position.

In a seventh possible implementation of the method according to the first aspect, or any implementation thereof, a plurality of reference objects may be detected with the camera situated in the first position. Further, a plurality of reference objects may be captured in the sampled images. The matching may also comprise mapping the reference value with the current object value.

In a scenario wherein the multibody system operates in a milking situation of an animal, the animal typically comprises four teats. Automatic milking of the animals typically is facilitated by being able to detect as many of the four teats as possible, why using the teats as reference objects for the camera is an advantage as swift teats detection will facilitate milking.

In an eighth possible implementation of the method according to the first aspect, or at least some of the previous implementations thereof, the method may also comprise triggering the maintenance measure when a measured time period between the requested movement and the start of the movement of the camera from the first position exceeds an initiation reference time limit by the threshold limit.

By measuring time consumption from request to termination of the movement, deterioration of the capacity of the multibody system over time (due to wear, lack of cleaning, lubrication and/or other service measures) could easily be measured and when reaching the initiation reference time limit, a service measure may be triggered, leading to a reliable functionality of the multibody system.

In a ninth possible implementation of the method according to the first aspect, or any implementation thereof, the reference object may comprise a moveable body part of an animal such as teats of the animal.

According to a second aspect of the invention, this objective is achieved by multibody system. The multibody system comprises two body sections assembled via a joint, wherein one of the body sections comprises a camera which is moveable between a first position and a second position. The multibody system comprises a control unit configured to detect a reference object via the camera situated in the first position. The control unit is also configured to determine a reference value of the reference object. In addition, the control unit is further configured to request movement of the camera from the first position into the second position. The control unit is configured to initiate movement of the camera from the first position towards the second position, while iteratively sampling an image of the reference object; determining a current object value of the reference object, based on the sampled image; matching the determined reference value with the current object value. Furthermore, the control unit is configured to determine successfulness of the movement of the camera from the first position into the second position, based on the matching.

Hereby, the functionality of the body sections of the multibody system is monitored and it could be ascertained that the body sections are either operating as expected or require maintenance/human inspection.

In a first possible implementation of the multibody system according to the second aspect, the control unit may also be configured to determine status of the multibody system, based on the determined successfulness of the camera movement. The control unit may furthermore be configured to output the determined status.

The status may be output to the user for example a colour code (green/yellow/red), a grading between e.g. 1-10, a happy/sad avatar for example in some arbitrary embodiments.

Hereby the user immediately understands the status of the multibody system and may take appropriate measures.

The status output may also, or alternatively in embodiment wherein time of the movement has been measured and compared with a reference value, comprise an estimated time to the proximate maintenance occasion. Hereby, service and maintenance measures may be performed when a delay over time has been detected.

In a second possible implementation of the multibody system according to the second aspect, or any implementation thereof, the control unit may be configured to measure time of the camera movement from the first position into the second position. Further, the control unit may also be configured to compare the measured time with a reference time limit. Also, the control unit may be configured to trigger a maintenance measure when the measured time exceeds the reference time by a threshold limit.

By measuring the time for completing the movement into the second position, and compare it with the reference value, a delay over time is detected and based there upon, wear (of bearings and other similar moving parts/sections) over time may be suspected and a service measure may be triggered such as lubrication and/or replacement at an optimal moment in time. Hereby, safety is enhanced as mechanical failures of the multibody system due to wear could be avoided. Emergency stops and delays are avoided or at least reduced.

In a third possible implementation of the multibody system according to the second aspect, or any implementation thereof, the control unit may be configured to determine a successfulness rate of the camera movement, based on stored determined successfulness of the camera movement. Further, the control unit may be configured to compare the determined successfulness rate with a reference value. The control unit may also be configured to trigger a maintenance measure when the determined successfulness rate is lower than the reference value.

Thanks to the disclosed solution, the farmer/operator could diagnose and identify mechanical sections of the multibody system with high running resistance and thereby enable replacement or service maintenance measures of them.

In a fourth possible implementation of the multibody system according to the second aspect, or any implementation thereof, the control unit may be configured to determine a reference vector between a reference point of the multibody system and the position of the reference object with the camera situated in the first position. Further the control unit may also be configured to determine an object vector between the reference point of the multibody system and the reference object in the sampled image. Additionally, the control unit may be configured to match the determined reference value with the current object value by a length comparison between the reference vector and the object vector.

By calculating the reference vector and the object vectors respectively, and using them for the matching, an easily implemented methodology is provided.

In a fifth possible implementation of the multibody system according to the second aspect, or any implementation thereof, the control unit may be configured to estimate angle between the reference vector and the object vector. Further, the control unit may also be configured to determine the movement of the camera from the first position into the second position to be successful when the estimated angle between the determined reference vector and the determined object vector is approximately zero. The control unit may also be configured to determine the movement of the camera from the first position into the second position to be unsuccessful when the estimated angle between the determined reference vector and the determined object vector is different from zero in addition to a reference limit. The control unit may also be configured to determine the movement of the camera from the first position into the second position to be unconfirmed, otherwise.

By calculating reference vector and the object vectors respectively and calculating an angle between them during the movement of the body section and the camera, the progress of the movement may be followed and for example be plotted in a diagram, whereby analysis of the movement may be made.

In a sixth possible implementation of the multibody system according to the second aspect, or at least some implementation thereof, the control unit may be configured to determine the reference value in form of coordinates, defining the position of the reference object. Also, the control unit may be configured to determine the current object value in form of coordinates, defining the position of the reference object in the sampled image. Furthermore, the control unit may be additionally be configured to match the determined reference value with the current object value by a comparison between the coordinates of the reference object.

By determining coordinates of the reference object for reference value and comparing it with the current object coordinates during the movement of the camera, a reliable method for determining whether the movement has been successfully terminated is provided. The coordinates may be absolute, or relative for example in relation to the camera position.

In a seventh possible implementation of the multibody system according to the second aspect, or any implementation thereof, the control unit may be configured to detect a plurality of reference objects with the camera situated in the first position. Further, the control unit may also be configured to capture a plurality of reference objects in the sampled images. Also, the control unit may be configured to perform the matching by mapping the reference value with the current object value.

In a scenario wherein the multibody system operates in a milking situation of an animal, the animal typically comprises four teats. Automatic milking of the animals typically is facilitated by being able to detect as many of the four teats as possible, why using the teats as reference objects for the camera is an advantage as swift teats detection will facilitate milking.

In an eighth possible implementation of the multibody system according to the second aspect, or any implementation thereof, the control unit may be configured to trigger the maintenance measure when a measured time period between the requested movement and the start of the movement of the camera from the first position exceeds an initiation reference time limit by the threshold limit.

By measuring time consumption from request to termination of the movement, deterioration of the capacity of the multibody system over time (due to wear, lack of cleaning, lubrication and/or other service measures) could easily be measured and when reaching the initiation reference time limit, a service measure may be triggered, leading to a reliable functionality of the multibody system.

In a ninth possible implementation of the multibody system according to the second aspect, or any implementation thereof, the control unit may also be configured to determine the reference value of the reference object. Also, the control unit may be configured to sample the image of the reference object. The control unit may furthermore be configured to determine the current object value of the reference object, based on the sampled image. The control unit may also be configured to match the determined reference value with the current object value when the reference object comprises a moveable body part of an animal.

According to a third aspect of the invention, this objective is achieved by a computer program.

The computer program comprises instructions which, when the computer program is executed by the control unit in the multibody system according to the second aspect, or any implementation thereof, cause the control unit to carry out the method according to the first aspect, or any implementation thereof.

Thanks to the described aspects, by determining the reference value of the reference object before starting the movement of the body section and the camera from the first position to the second position and then continuously sampling images of the reference object and matching the current object value with the reference value successfulness of the movement could be determined. When the current object value corresponds to the determined reference value, it could be concluded that the movement into the second position has been completed successfully. In case the current object value never approaches or corresponds to the determined reference value (at least not within a time limit) it is concluded that the movement has failed and the multibody system/body section/camera and/or joint is dysfunctional and require maintenance.

Hereby, the intended movements of the body section/camera between the first position and the second position is monitored and supervised in a reliable manner and an emerge problem or dysfunction of the multibody system is detected, also in a scenario wherein the body section/camera is part of a robot or a vehicle which in turn also is moving.

Other advantages and additional novel features will become apparent from the subsequent detailed description.

FIGURES

Embodiments of the invention will now be described in further detail with reference to the accompanying figures, in which:

FIG. 2B illustrates an example of a multibody system according to an embodiment of the invention;

DETAILED DESCRIPTION

Embodiments of the invention described herein are defined as a method, a multibody system and a computer program, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
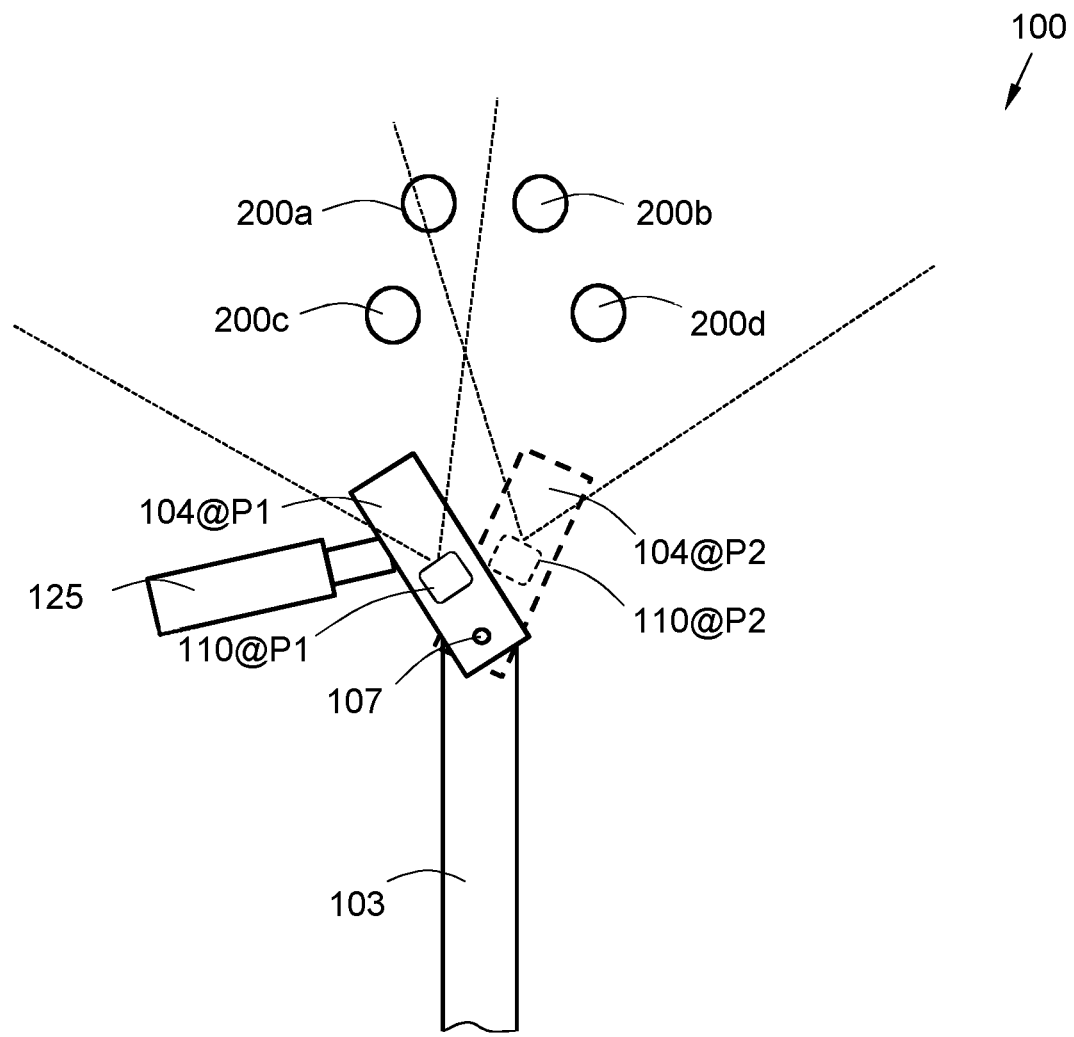
FIG. 1 illustrates an example of a section of a multibody system according to an embodiment of the invention.

FIG. 1 illustrates at least a section of a multibody system 100. The multibody system 100 comprises at least two body sections 103, 104 assembled via a joint 107. One of the body sections 104 comprises a camera 110, wherein the body section 104 and the camera 110 are moveable between a first position P1 and a second position P2. The camera 110 may be for example a three-dimensional (3D) camera, such as a stereo camera or a range camera.

The at least two body sections 103, 104 of the multibody system 100 may be situated on other moveable sections or structures, for example of a milking robot or similar arrangement.

These movements are however known and compensation for these movements may be calculated for when performing the herein described method.

The camera 110 may be fixedly mounted on the body section 104, so that the body section 104 and the camera 110 may move jointly between the first position P1 and the second position P2.

The movement between the first position P1 and the second position P2 may be realised by manipulator 125 such as e.g. a pneumatic or hydraulic cylinder, an electric motor, a steam engine or other corresponding energy transferring structure, acting on the body section 104 on which the camera 110 is mounted thereby causing the body section 104/camera 110 to move between the first position P1 and the second position P2. The respective first and second positions P1, P2 of the body section 104/camera 110 thereby correspond to the respective end positions of the manipulator 125.

The manipulator 125 may be set into a plurality of fixed positions in some embodiments, thereby guiding the body section 104 into a corresponding plurality of positions P1, P2, exceeding two.

In the illustrated embodiment, the body section 104 and the comprised camera 110 are illustrated when being positioned in the first position P1 and the second position P2, respectively.

The multibody system 100 may comprise an agricultural structure with moving sections, such as for example a milking robot. The camera 110 may be used for capturing images of one or several teats of an animal, thereby guiding the positioning of milking cups on the teats and thereby enabling automatic milking of the animal by the milking robot.

The animal may for example be a cow or similar female, milk generating mammal. As the animal is alive and may move freely in an unpredicted way, various problems may occur that may affect the operation of the multibody system 100.

For example, the animal may by accident kick, tilt or step on the body sections 103, 104 thereby affecting their functionality. Also, dirt or hair of the animal may get stuck on the body sections 103, 104, the joint 107 or the manipulator 125, thereby affecting the movements of the body section 104 and the camera 110. For example, the body section 104 and the camera 110 may not be able to move at all, i.e. even when the manipulator 125 is triggered to move from the first position P1 towards the second position P2. Another problem is to determine when the movement is ready, i.e. when the body section 104 and the camera 110 has arrived to the second position P2. Yet another problem may be to detect the wear over time of the joint 107, without human intervention and/or usage of a particular dedicated sensor for these purposes.

The camera 110, when positioned in the first position P1 may not be able to detect the teat of the animal that currently is subject to mounting of milking equipment. The reason may be that another one of the teats or other body part of the animal may block a part of the view of the camera 110, or the animal may be oddly positioned within the milking location. It may then be desired to move the body section 104 and the camera 110 into the second position P2, for enabling the camera 110 to capture images of the relevant teat, or possibly even all of the teats.

To be able to make correct calculations about positions for the teat seen by the camera 110, the camera position must be known. If the body section 104, the joint 107 or the manipulator 125 is malfunctioning the calculations will be wrong, leading to failure during the automatic milking.

Figure 2A:
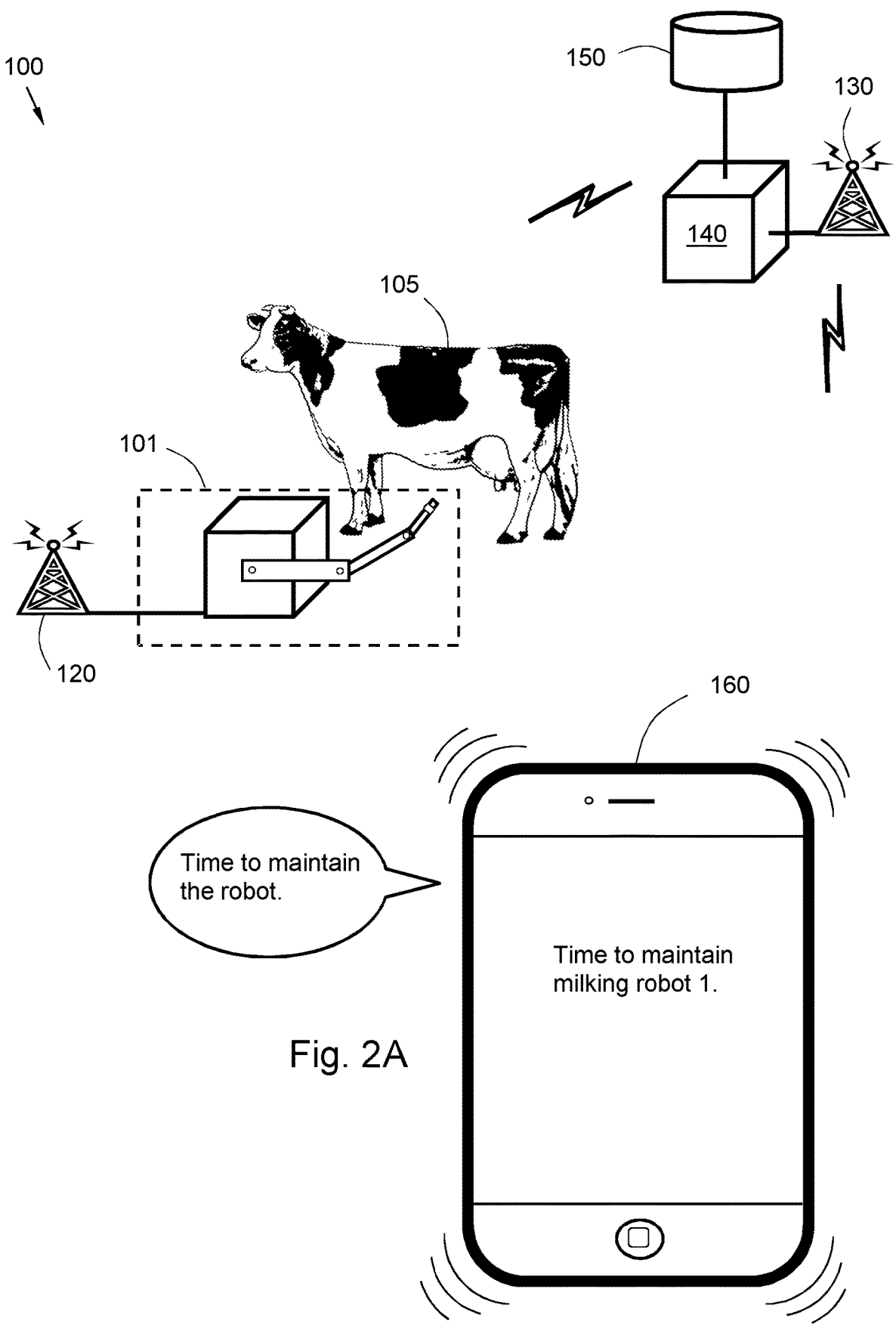
FIG. 2A illustrates an example of a multibody system according to an embodiment of the invention.

The provided method comprises detecting one or more of reference objects 200a, 200b, 200c, 200d when the body section 104 and the camera 110 are situated in the first position P1. The reference object 200a, 200b, 200c, 200d may be static, and comprise for example a part of the stable or a milking equipment, or dynamic, i.e. moveable and comprise a body part of the animal such as the teats, as schematically illustrated in FIGS. 2A/2B. Further, a reference value of the reference object 200a, 200b, 200c, 200d is determined. It is then determined to move the body section 104 and the camera 110 from the first position P1, into the second position P2. Movement of the body section 104 and the camera 110 is then initiated, to move from first position P1 towards the second position P2 while iteratively sampling an image of the reference object 200a, 200b, 200c, 200d; determining a current object value of the reference object 200a, 200b, 200c, 200d, based on the sampled image; and matching the determined reference value with the current object value. Based upon the matching, the successfulness of the movement of the body section 104 and the camera 110 from the first position P1 into the second position P2 is determined.

The reference value may be determined while the body section 104/camera 110 is situated in the first position P1, i.e. before the movement to the second position P2 is initiated. The reference value may for example comprise an estimation related to the reference object as it would be perceived by the camera 110 when the body section 104/camera 110 having successfully moved into the second position P2.

In other embodiments, the reference value may comprise a difference between the reference object as it is perceived by the camera 110 while the body section 104/camera 110 yet are being positioned in the first position P1 and an estimation of how the reference object may be perceived by the camera 110 when the body section 104/camera 110 is situated in the second position P2.

According to some embodiments of the disclosed solution, the teat position(s) as captured by the camera 110 before the movement of the body section 104/camera 110 from the first position P1 towards the second position P2 is used as a reference to monitor the actual change in real time. This is further discussed and schematically illustrated in FIGS. 3A-3F.

The robot/multibody system 100 may normally be moving during the change of positions and therefore the algorithm may be designed to handle the robot movement. The animal might also move during the change and there may also be other sources to uncertainties, therefore the algorithm may be designed to give result as confirming the successfulness of the movement from the first position P1 to the second position P2, determining that the movement is unsuccessful, and determining that the successfulness of the movement could not be confirmed at all. Further, statistical analysis may be applied in some embodiments, to further reduce false positive confirmations and thereby improve reliability of the disclosed method.

Furthermore, the provided solution may measure the time from requested movement from the first position P1 to the second position P2 until the actual movement starts and the time for the actual movement to be successful in some embodiments. The framerate of the camera 110 may be for example 50 ms between each sample, or there about. However, a more intense framerate like for example 10 ms between each sample may lead to increased precision of the measurement while a sparser framerate like about 200 ms between each sample may lead to reduced hardware costs as a camera with less capacity may be used. Measurements may also be made during the position change, to detect whether the body section 104 with the camera 110 gets stuck halfway between the positions P1, P2, for example.

Figure 2C:
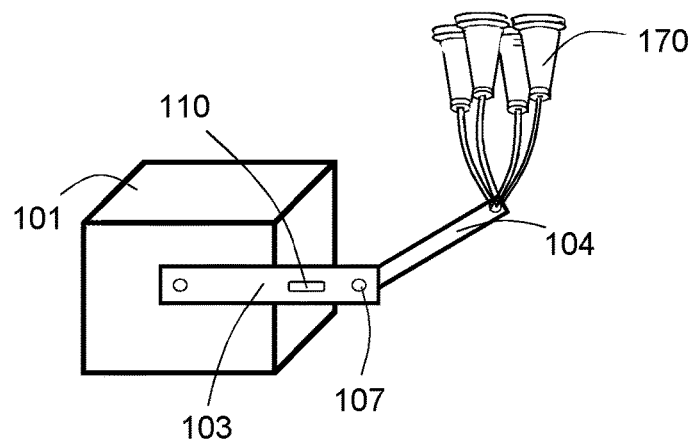
FIG. 2C illustrates an example of a multibody system according to an embodiment of the invention.

FIG. 2A presents a general overview of an example of the environment in which the presented solution may be applied, FIG. 2B presents details of an example of the milking robot 101 while FIG. 2C disclose an example of the milking robot 101 wherein milking equipment is attached to the body section of the milking robot 101. The functionality of the invention is disclosed and FIGS. 3A-3F and is described in the corresponding sections of the description.

FIG. 2A illustrates a scenario at an agricultural environment, such as a barn, a milking parlour, a stable, etc. The agricultural environment comprises a multibody system 100. The multibody system 100 in the illustrated embodiment comprises an agricultural structure with moving sections, such as for example a milking robot 101. The milking robot 101 comprises at least two body sections assembled via a joint, which body sections are moveable in relation to each other via the joint, for example by operation of a manipulator 125 operating on one of the body sections, thereby placing the body sections in at least two defined positions in relation to each other, i.e. the first position P1 and the second position P2.

A purpose of the disclosed solution is to monitor successfulness of the intended movement of the two body sections via the joint, from the first position P1 and into the second position P2.

The milking robot 101 is merely to be regarded as an example of an agricultural structure/multibody system 100. The agricultural structure with the moving section may be e.g. a mixer wagon with a rotating auger, a milking parlour with a rotating platform, or a fence with a gate for example. The agricultural structure may be stationary or mobile in different embodiments.

In the depicted scenario, the milking robot 101 is operating on an animal 105.

The multibody system 100 also comprises control unit 140, for controlling the operation of the milking robot 101. The control unit 140 may be comprised within the milking robot 101 or be external thereto but connected via a wired or wireless communication interface. In the illustrated embodiment, the milking robot 101 and the control unit 140 communicate wirelessly via a respective transceiver 120, 130.

The emitted radio signals of the transceivers 120, 130 may be based on various different technologies in different embodiments, such as e.g. Ultra-Wideband (UWB), Bluetooth, WiFi, etc.

The multibody system 100 may also comprise a database 150, connected to or associated with the control unit 140. Various data associated with the milking robot 101 and/or the movements of the body sections may be stored in the database 150, possibly associated with an identity reference and/or a time stamp. Also, one or more threshold limits may be stored in the database 150, which will be further discussed later in this document.

When the movement of the body section is not successful, an alert may be sent to a predefined electronic device 160 of an administrator of the milking robot 101, such as a farmer service supplier, or similar person working at, or temporarily visiting the agricultural environment.

The electronic device 160 may comprise e.g. a cellular mobile telephone, a stationary or portable computing device, a computer tablet, a pair of intelligent glasses, a smart contact lens, an augmented reality device, a smart watch or similar device having a user interface and wireless communication ability.

The alert may be output as audio information, visual information and/or tactile information on the electronic device 160, thereby informing the farmer about the status of the multibody system 100.

The moving body section may be the last movable link of the milking robot 101, which some-times may be referred to as an end effector. The moving body section may comprise a sensor such as a camera 110, used for example for getting a clear view of the teats of the animals 105, during milking operation. For example when the view of the camera 110 is limited when the moving body section 104/camera 110 is situated in the first position P1, the body section 104/camera 110 may be instructed to move to the second position P2, to get a new camera view of the teats from the second defined position P2. Thereby, the camera 110 may get a clear view of the rear teats of the animal 105. However, various problems may occur, causing the body section 104/camera 110 in question to get stuck without ever being able to arrive at the second position P2, the joint to deteriorate, etc. The body section 104 may for example be affected by the animal 105 for example kicked or otherwise broken.

FIG. 2B presents a non-limiting example of a milking robot 101, comprising three body sections 102, 103, 104 assembled via a respective joint 105, 106, 107. The last movable body section 104 comprises a camera 110.

Some or all of these different body sections 102, 103, 104 may move in relation to each other. Also, the milking robot 101 as a whole may be moving in relation to the stable. Probably needless to mention, the animal 105 or a body part thereof, such as the tail, may move in relation to the stable. The known movements of the milking robot 101 and/or body sections 102, 103, 104 thereof, may be compensated for when making the calculations for determining position of the teats. The movements of the animal 105 during the camera movement between the two positions P1 and P2 are unknown and may be compensated for by applying an appropriate (relatively generous) margin of error, for example about 5-10% of the measurement value.

FIG. 2C illustrates an alternative embodiment of a multibody system 100 comprising a milking robot 101 with a plurality of body sections 103, 104 assembled via a respective joint 107. The multibody system 100 may be similar to the previously discussed multibody systems 100, with the difference that milking equipment 170 is mounted on the milking robot, for example on the body section 104, while being moveable in relation to the camera 110 that is fixedly mounted on the body section 103. The teat cups of the milking equipment 170 have known positions on the body section 104. Hereby the teat cup/teat cups may be utilised as reference object 170.

It is to be noted that the position of the camera is known.

FIGS. 3A-3F schematically illustrate the relative view of the reference object 200a, 200b, 200c, 200d as it may be perceived by the camera 110 when the body section 104 and the thereupon mounted camera 110 are successfully moving from the first position P1, into the second position P2, in an embodiment.

Figure 3A:
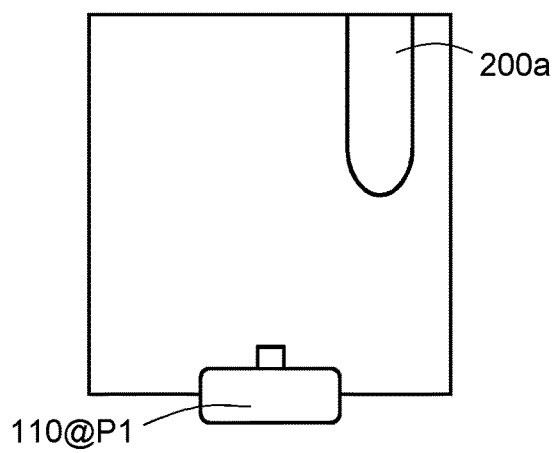
FIG. 3A-3F illustrate examples of a section/camera moving between two positions, according to an embodiment of the invention.

When determining to start the movement, the body section 104 and the camera 110 may be situated in the first position P1, as illustrated in FIG. 3A. An image of the reference object 200a may be captured.

Figure 3B:
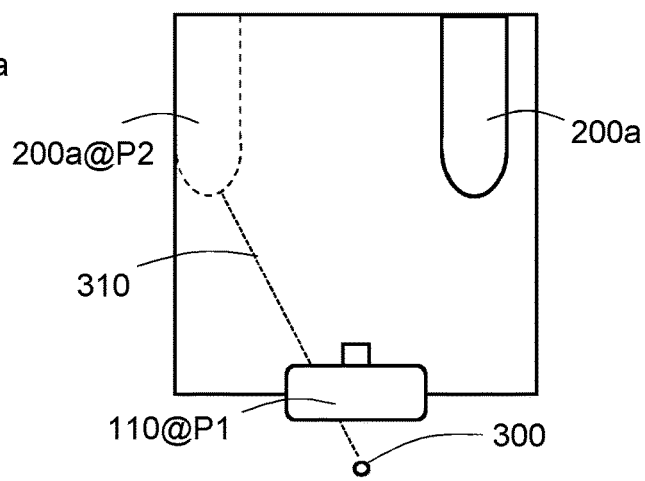

Further, a future position of the reference object 200a, as it will be perceived by the camera 110 when situated in the second position P2 may be calculated. Also, a reference vector 310 between a reference point 300 of the body section 104, such as for example the joint 107, to the calculated future position of the reference object 200a as illustrated in FIG. 3B. The reference vector 310 may be stored in a memory and kept as a reference until the movement of the body section 104 and the camera 110 into the second position P2 is successfully terminated in some embodiments.

Figure 3C:
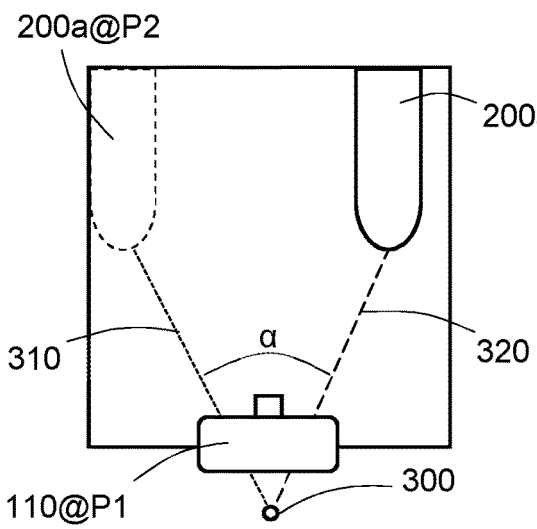
Figure 3D:
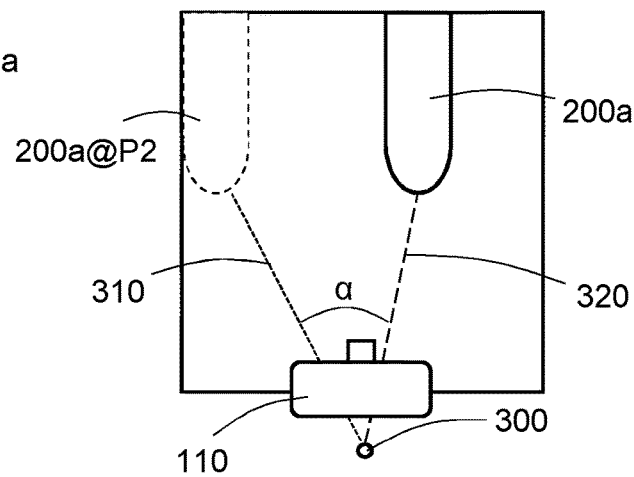

Images may then be captured continuously during the movement of the body section 104 and the camera 110 into the second position P2. FIG. 3C illustrates calculation of an object vector 320 between the reference point 300 of the body section 104 and the reference object 200a, as captured by the camera 110. Also, the object vector 320 may be compared with the reference vector 310 and a difference a between them may be calculated in some embodiments. In FIG. 3C, the body section 104 and the camera 110 are still situated in the first position P1, while FIG. 3D illustrates how the difference a between the captured position of the reference object 200a and the expected position of the reference object 200a as perceived by the camera 110 when situated in the second position P2 has been somewhat reduced as the camera 110 has approached the second position P2.

Figure 3E:
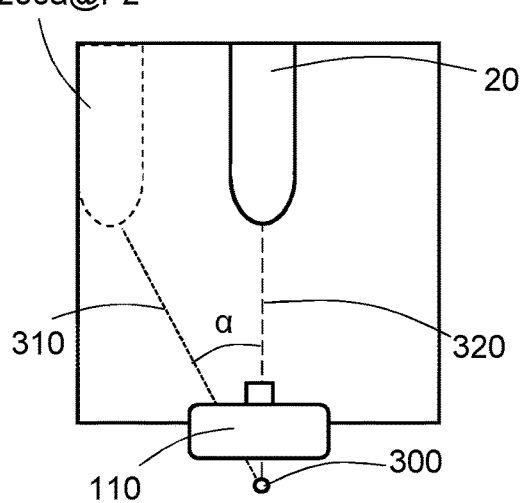

In FIG. 3E, the body section 104 and the camera 110 has approached closer to P2, leading to a smaller difference a between the captured position of the reference object 200a and the expected position of the reference object 200a.

Figure 3F:
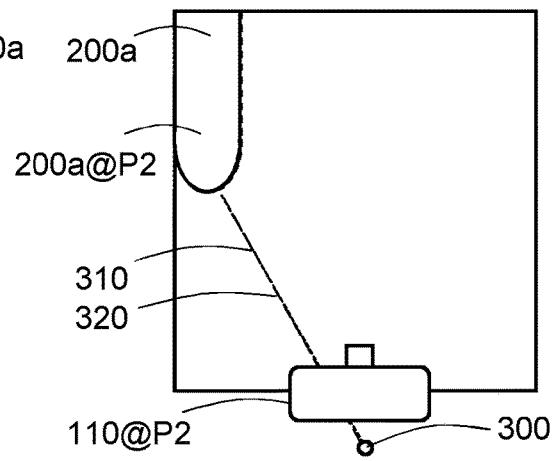

FIG. 3F illustrates when the body section 104 and the camera 110 has arrived successfully to the second position P2. The difference a between the captured position of the reference object 200a and the expected position of the reference object 200a is non-existent in this successful example, and it could be concluded that the movement into the second position P2 has been successful and the body sections 103, 104 and the joint 107 are functioning correctly.

Figure 4C:
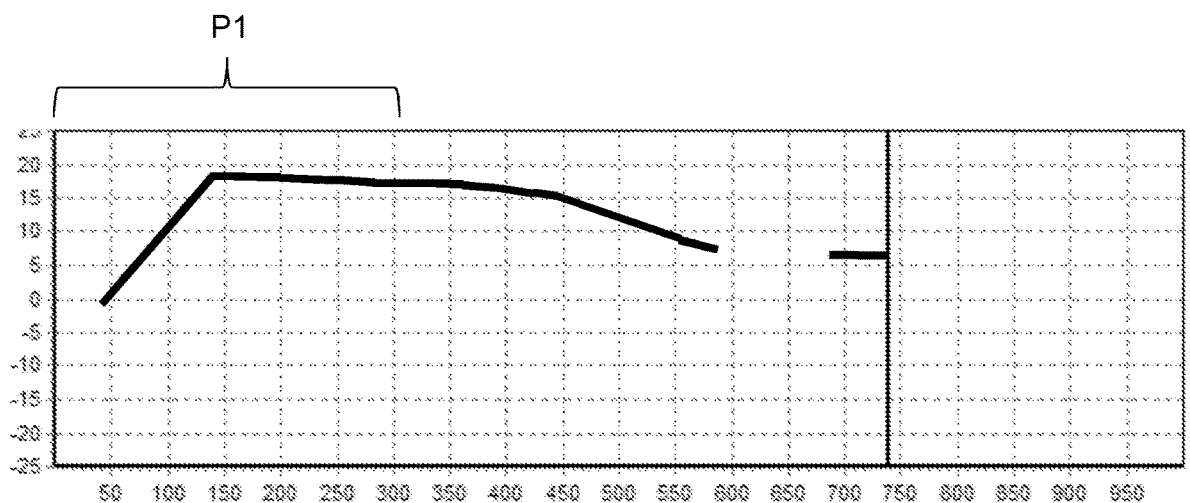
FIG. 4C illustrates an example of a diagram, according to an embodiment of the invention.
Figure 4A:
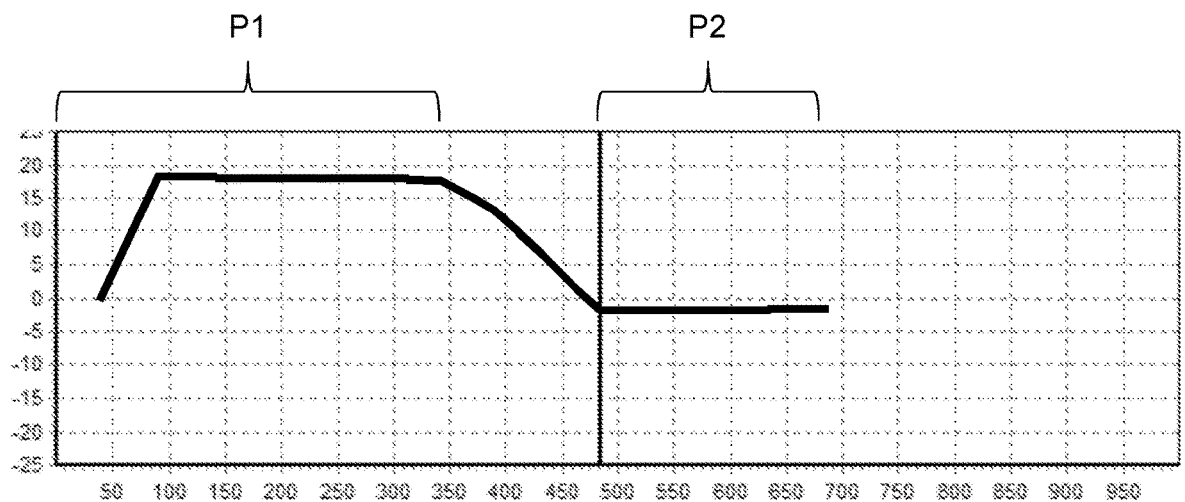
FIG. 4A illustrates an example of a diagram, according to an embodiment of the invention.

FIG. 4A illustrates an example of a diagram resulting from performing the described method in an embodiment. The vertical axis indicates a quantity of the difference a between the captured position of the reference object 200a and the expected position of the reference object 200a. The horizontal axis illustrates time passed since the position change from the first position P1 into the second position P2 is determined to be initiated.

In the illustrated example, the difference a, here measured as an angle between the reference vector 310 and the object vector 320, increase into about 18 degrees while the body section 104 and the camera 110 is in the first position P1, and then approximately linearly decrease to zero as the body section 104 and the camera 110 reaches the second position P2. The vertical black line illustrates when it may be concluded that the movement into the second position P2 is completed successfully.

Figure 4B:
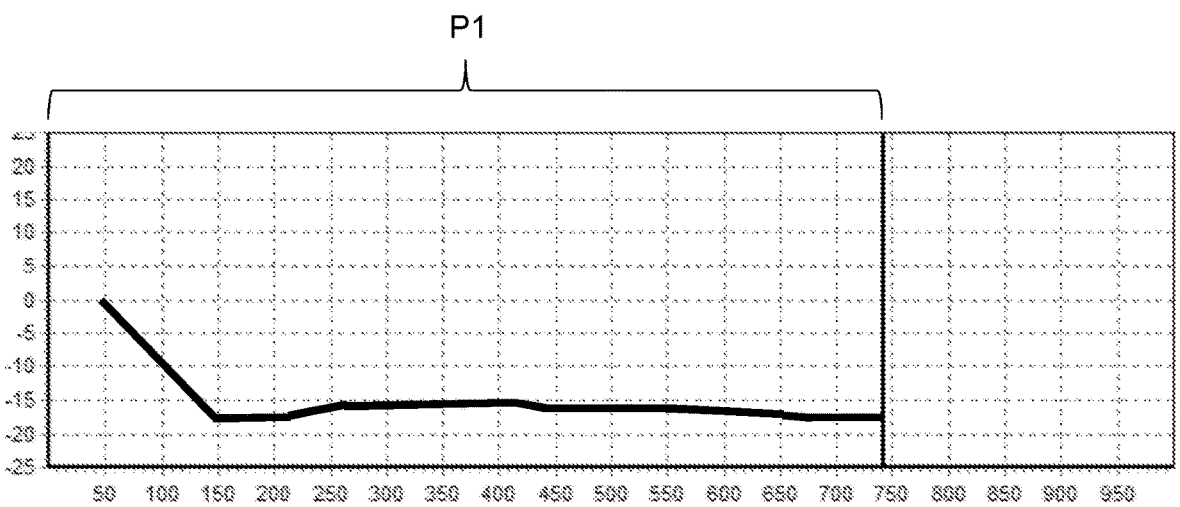
FIG. 4B illustrates an example of a diagram, according to an embodiment of the invention.

FIG. 4B graphically illustrates a scenario wherein the body section 104 and the camera 110 is stuck in the first position P1 and is not moving notably. The difference a, or expected angle error, is detected but never returns back to about 0. The reason is that the body section 104 and the camera 110 is not moving notably from the first position P1 and never reaches the second position P2, at least not within a predetermined or configurable time limit, in the graph of FIG. 4B illustrated by the vertical black line after about 750 ms.

FIG. 4C graphically illustrates a scenario wherein the body section 104 and the camera 110 somewhat have started to leave the first position P1 but it seems to get stuck halfway. The interruption of the line in the graph is due to that one or several images captured by the camera 110 could not be used. Again, the vertical black line after about 750 ms may illustrate a predetermined or configurable time limit.

Figure 5A:
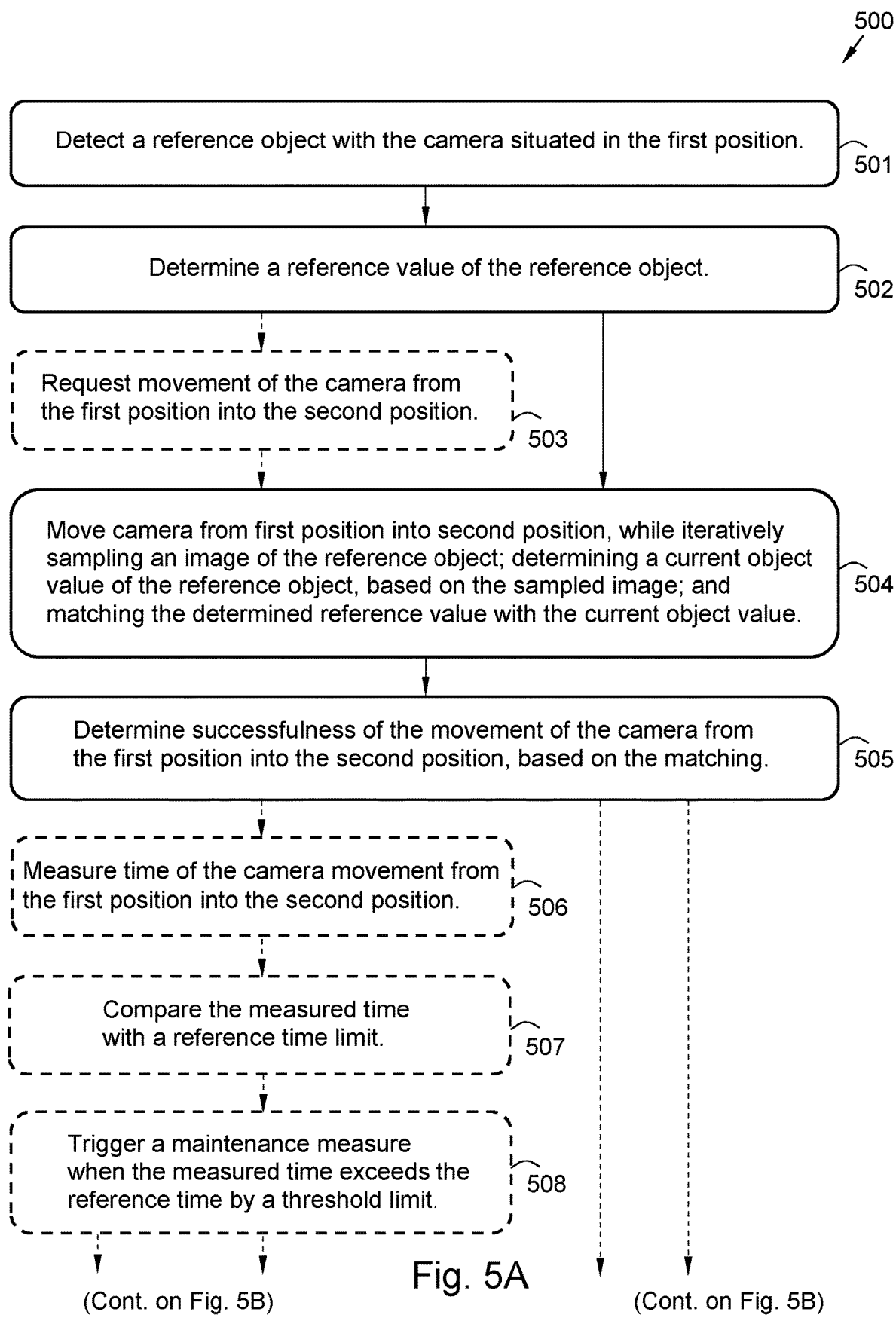
FIG. 5A-5B illustrate a flow chart illustrating an embodiment of a method.
Figure 5B:
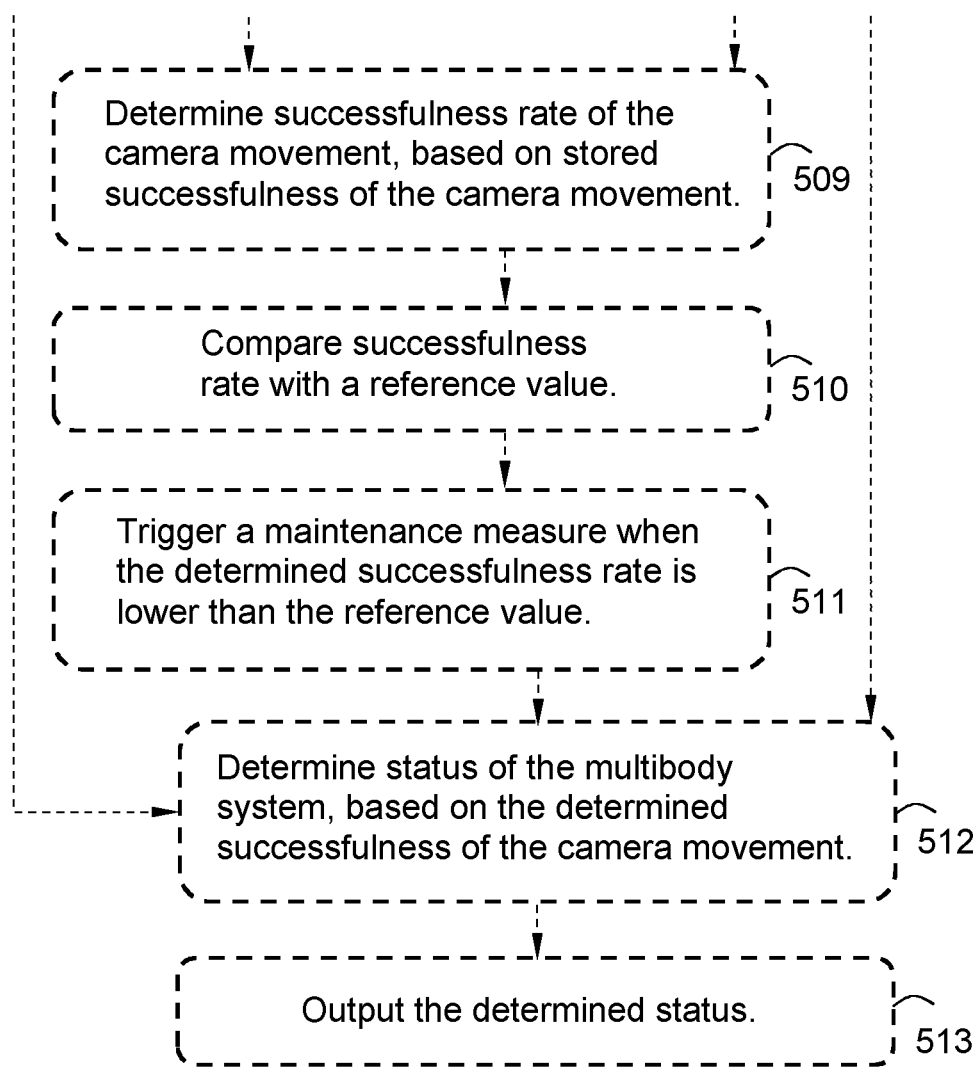

FIGS. 5A and 5B illustrate an example of a method 500 according to an embodiment. The flow chart in FIGS. 5A and 5B show the method 500 in relation to a multibody system 100. The multibody system 100 comprises at least two body sections 101, 102, 103, 104 assembled via a joint 105, 106, 107, wherein one of the body sections 104 comprises a camera 110 which is moveable between a first position P1 and a second position P2.

The movement may be executed by a manipulator 125, which is acting on the body section 104 comprising the camera 110 and is moving from a first end position into a second end position, thereby causing the camera 110 to move between the first position P1 and the second position P2 in an ideal situation without hindrance for the movement.

The multibody system 100 may be any kind of mechanical structure comprising body sections 101, 102, 103, 104 which are moveable in relation to each other. In some embodiments, the multibody system 100 may be particularly arranged to operate in an agricultural environment and for example be represented by any of: a robot having a moving arm (such as a milking robot), a mixer wagon with a rotating auger, a milking parlour with a rotating platform, a fence with a gate or similar.

However, the examples provided herein of a multibody system 100 in an agricultural environment is merely to be regarded as illustrative, no limiting examples. The multibody system 100 may in other embodiments operate in an industrial environment, construction environment or mining environment, for example.

In order to correctly trigger the accident avoidance measure, the method 500 may comprise a number of steps 501-513. However, some of these steps 501-513 may be performed solely in some alternative embodiments, like e.g. steps 503 and/or 506-513. Further, the described steps 501-513 may be performed in a somewhat different chronological order than the numbering suggests in some embodiments. The method 500 may comprise the subsequent steps:

Step 501 comprises detecting a reference object 200a, 200b, 200c, 200d with the camera 110, when the camera 110 and the body section 104 on which the camera 110 is fixedly mounted are situated in the first position P1.

In some embodiments, a plurality of reference objects may be detected 501 with the camera 110 when situated in the first position P1.

The reference object may in some embodiments comprise a moveable body part of an animal, such as one or several teats of the animal.

The reference object 200a, 200b, 200c, 200d may in some embodiments be static objects such as milking equipment 170, for example, or a part of an automatic milking station (AMS).

Step 502 comprises determining a reference value of the reference object 200a, 200b, 200c, 200d.

The determined 502 reference value of the reference object 200a, 200b, 200c, 200d may comprise a reference vector 310 between a reference point 300 of the multibody system 100 and the position of the reference object 200a, 200b, 200c, 200d with the camera 110/body section 104 situated in the first position P1, in some embodiments; or with the camera 110/body section 104 situated in the second position P2.

The determined current object value of the reference object 200a, 200b, 200c, 200d, based on the sampled image may comprise an object vector 320 between the reference point 300 of the multibody system 100 and the reference object 200a, 200b, 200c, 200d in the sampled image.

In some embodiments wherein the reference value comprises the reference vector 310 and the current object value comprises the object vector 320, the step of determining the reference value may comprise estimating a difference or angle α between the reference vector 310 and the object vector 320.

The determined 502 reference value of the reference object 200a, 200b, 200c, 200d and the current object value of the reference object 200a, 200b, 200c, 200d may comprise respective coordinates, defining the position of the reference object 200a, 200b, 200c, 200d, such as for example absolute or relative coordinates. The coordinates or position of the reference object 200a, 200b, 200c, 200d may be determined by a locating algorithm, based on trilateration, multilateration, or triangulation in different embodiments.

Step 503 comprises requesting movement of the camera 110 and the body section 104 on which the camera 110 is fixedly mounted from the first position P1 into the second position P2.

Step 504 comprises initiating movement of the camera 110 and the body section 104 on which the camera 110 is fixedly mounted from the first position P1 towards the second position P2, while iteratively sampling an image of the reference object 200a, 200b, 200c, 200d; determining a current object value of the reference object 200a, 200b, 200c, 200d, based on the sampled image; and matching the determined 502 reference value with the current object value.

The movement of the body section 104/camera 110 may be performed by activation of a manipulator 125, between two extreme positions.

In some embodiments, a plurality of reference objects 200a, 200b, 200c, 200d may be captured in the sampled images and the matching may comprise mapping the reference value with the current object value of the plurality of reference objects 200a, 200b, 200c, 200d.

In some embodiments wherein the reference value comprises the reference vector 310 and the current object value comprises the object vector 320, the matching of the determined 502 reference value with the current object value may then be made by a length comparison between the reference vector 310 and the object vector 320 in some embodiments.

In other embodiments, wherein an estimation of an angle α between the reference vector 310 and the object vector 320 has been estimated, the matching may be made by comparing the angle α with zero, possibly in addition to a threshold limit, such as for example 5% difference, 10% difference, etc. The threshold limit may be set to 0%, perhaps in particular in embodiments wherein the reference object 200a, 200b, 200c, 200d is static.

An advantage of applying a threshold limit when making the matching is that when the reference object 200a, 200b, 200c, 200d comprises a body part of the animal 105 such as the teats, a simultaneous movement of the animal 105 during the movement of the camera 110 from the first position P1 into the second position P2 may occur. Thus, the matching may deviate somewhat, even when the movement into the second position P2 has been made successfully.

It may be noted that the body section 104/camera 110 never arrives to the second position P2; or may even not leave the first position P1.

Step 505 comprises determining successfulness of the movement of the body section 104/camera 110 from the first position P1 into the second position P2, based on the matching of the determined 502 reference value with the current object value.

In some embodiments wherein the reference value comprises the reference vector 310 and the current object value comprises the object vector 320, the movement of the body section 104/camera 110 from the first position P1 into the second position P2 may be determined 505 to be successful when the estimated angle α between the determined 502 reference vector 310 and the determined object vector 320 is approximately zero; or unsuccessful when the estimated angle α between the determined 502 reference vector 310 and the determined object vector 320 is different from zero in addition to a reference limit; or unconfirmed, otherwise.

In this alternative embodiment, the reference vector 310 has been determined 502, while the body section 104/camera 110 is situated in the first position P1, to the position of the reference object 200a as it will be perceived when the body section 104/camera 110 has successfully moved into the second position P2.

However, in other embodiments, the situation may be the opposite. The successfulness of the movement of the body section 104/camera 110 from the first position P1 into the second position P2 may be determined 505 to be successful when the estimated angle α between the determined 502 reference vector 310 and the determined object vector 320 is approximately a predetermined value; or unsuccessful when the estimated angle α between the determined 502 reference vector 310 and the determined object vector 320 is different from the predetermined value in addition to a reference limit; or unconfirmed, otherwise.

In this alternative embodiment, the reference vector 310 has been determined 502, while the body section 104/camera 110 is situated in the first position P1, to the position of the reference object 200a as it is perceived by the body section 104/camera 110 in the first position P1. An estimation of the angle α between the determined 502 reference vector 310 and a future position of the reference object 200a as it will be perceived when the body section 104/camera 110 has successfully moved into the second position P2 has then been calculated, here referred to as predetermined value, which predetermined value then is used for the comparison.

Hereby, the functionality of the moving sections 103, 104 of the multibody system 100 is thereby monitored and it could be ascertained that the moving sections are either operating as expected or require maintenance/human inspection.

Step 506 which may be performed only in some embodiments, comprises measuring time of the camera movement of the body section 104/camera 110 from the first position P1 into the second position P2.

Step 507 which may be performed only in some embodiments wherein step 506 has been performed, comprises comparing the measured 506 time with a reference time limit.

Step 508 which may be performed only in some embodiments wherein step 507 has been performed, comprises triggering a maintenance measure when the measured 506 time exceeds the reference time by a threshold limit, according to the made comparison 507.

In some embodiments, the maintenance measure may be triggered 508 when a measured time period between the requested 503 movement and the start of the movement 504 of the body section 104/camera 110 from the first position P1 exceeds an initiation reference time limit by the threshold limit.

Step 509 which may be performed only in some embodiments, comprises determining a successfulness rate of the camera movement, based on stored determined 505 successfulness of the camera movement.

Step 510 which may be performed only in some embodiments wherein step 509 has been performed, comprises comparing the determined 509 successfulness rate with a reference value.

Step 511 which may be performed only in some embodiments wherein step 510 has been performed, comprises triggering a maintenance measure when the determined 509 successfulness rate is lower than the reference value, according to the made comparison 510.

Step 512 which may be performed only in some embodiments, comprises determining status of the multibody system 100, based on the determined 505 successfulness of the camera movement.

The status may be output and presented for a user e.g. in form of a rating 0-10, or 1-100 for example (non-limiting arbitrary examples), a colour such as green (status: OK), red (status: dysfunctional) and/or yellow (status: some anomaly has occurred during performance of the method 500 and the status could not be determined). Other kinds of status output may be to output a happy/sad/panicking avatar, letters such as A-F, etc.

The status output may also, or alternatively in embodiment wherein time of the movement has been measured and compared with a reference value, comprise an estimated time to the proximate maintenance occasion. Hereby, service and maintenance measures may be performed when a delay over time has been detected.

Step 513 which may be performed only in some embodiments wherein step 512 has been performed, comprises outputting the determined 512 status.

In some embodiments wherein the determined 512 status is below a threshold limit, an alert may be emitted to an electronic device 160 of the farmer. Also, or alternatively, the movements of the body section 104 and thereby of the camera 110; or the milking robot as a whole, may be deactivated and/or prohibited. Hereby, a severe accident such as for example hurting an animal 105 close to the multibody system 100 may be avoided, saving animal suffering and promoting animal happiness on the farm. Also, a more secure working environment is created, and accidents may be avoided or at least reduced with regard to consequences.

Figure 6:
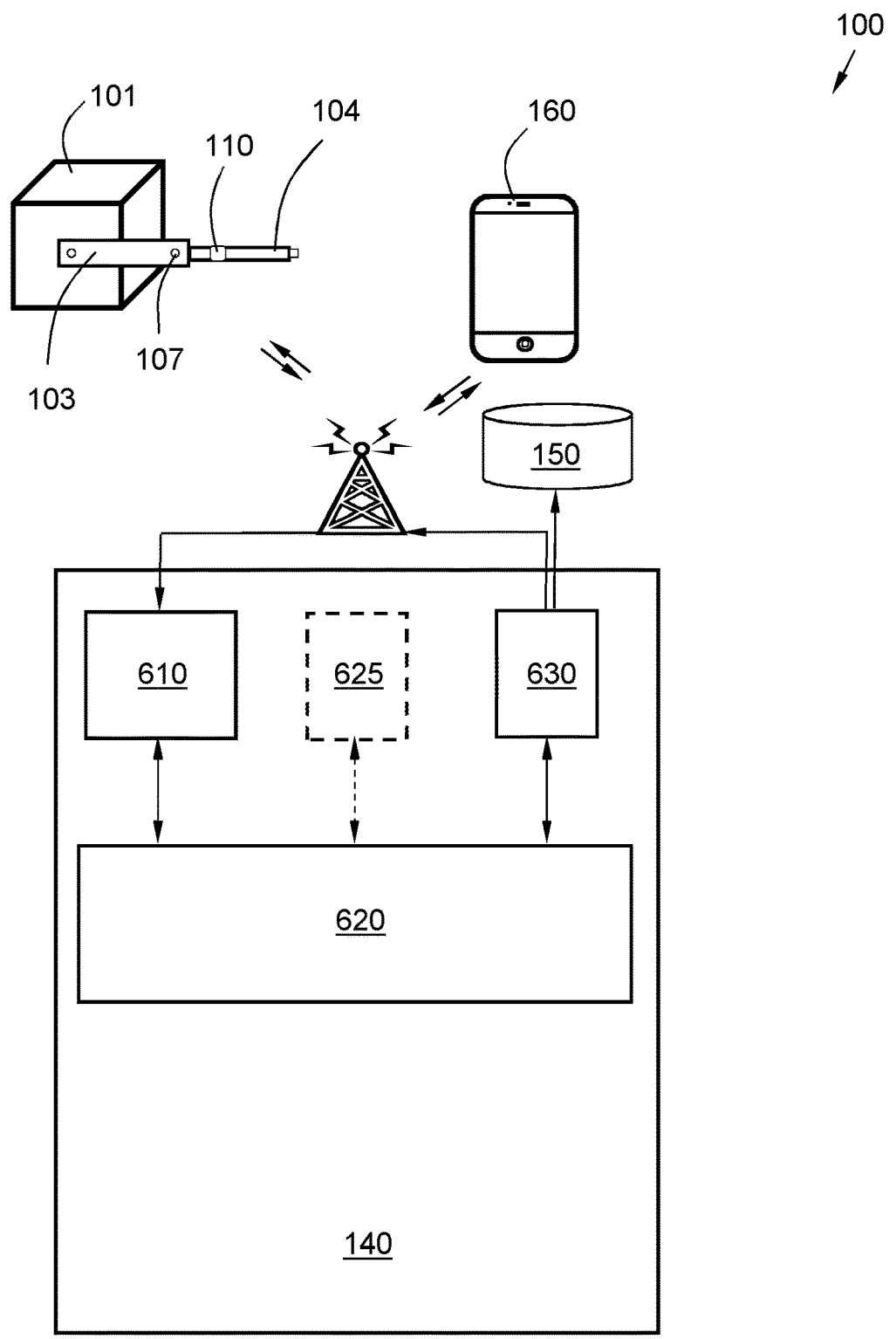
FIG. 6 is an illustration depicting a multibody system according to an embodiment.

FIG. 6 illustrates an embodiment of a multibody system 100. The multibody system 100 comprises two body sections 101, 102, 103, 104 assembled via a joint 105, 106, 107, wherein one of the body sections 104 comprises a there upon mounted camera 110. Thus, the camera 110 is fixedly mounted on the body section 104 so that they are moving jointly.

The body section 104/camera 110 is moveable between a first position P1 and a second position P2.

The multibody system 100 may perform at least some of the previously described steps 501-513 according to the method 500 described above and illustrated in FIGS. 5A and 5B, for determining successfulness of the movement of the body section 104/camera 110 from the first position P1 into the second position P2.

The multibody system 100 comprises a control unit 140, for controlling the movements of the body section 104 comprising the camera 110. The control unit 140 is configured to detect a reference object 200a, 200b, 200c, 200d via the camera 110 when the body section 104/camera 110 is situated in the first position P1. Further, the control unit 140 is configured to determine a reference value of the reference object 200a, 200b, 200c, 200d. The control unit 140 is also configured to request movement of the body section 104/ camera 110 from the first position P1 into the second position P2. The control unit 140 is in addition also configured to initiate movement of the body section 104/camera 110 from the first position P1 towards the second position P2, while iteratively sampling an image of the reference object 200a, 200b, 200c, 200d; determining a current object value of the reference object 200a, 200b, 200c, 200d, based on the sampled image; and matching the determined reference value with the current object value. In addition, the control unit 140 is configured to determine successfulness of the movement of the body section 104/camera 110 from the first position P1 into the second position P2, based on the matching.

The control unit 140 may in some embodiments be configured to determine status of the multibody system 100, based on the determined successfulness of the camera movement.

The control unit 140 may also be configured to output the determined status of the multibody system 100, e.g. via an electronic device 160 of a relevant farmer.

In yet some embodiments, the control unit 140 may be configured to measure time of the camera movement from the first position P1 into the second position P2. Also, the control unit 140 may be configured to compare the measured time with a reference time limit; and trigger a maintenance measure when the measured time exceeds the reference time by a threshold limit.

Also, or additionally, the control unit 140 may be configured to determine a successfulness rate of the camera movement, based on stored determined successfulness of the camera movement; compare the determined successfulness rate with a reference value; and trigger a maintenance measure when the determined successfulness rate is lower than the reference value, in some embodiments.

The control unit 140 may furthermore be configured to determine a reference vector 310 between a reference point 300 of the multibody system 100 and the position of the reference object 200a, 200b, 200c, 200d with the camera 110 when the body section 104/camera 110 is situated in the first position P1. Also, the control unit 140 may be configured to determine an object vector 320 between the reference point 300 of the multibody system 100 and the reference object 200a, 200b, 200c, 200d in the sampled image. The control unit 140 may also be configured to match the determined reference value with the current object value by a length comparison between the reference vector 310 and the object vector 320.

In some embodiments, the control unit 140 may be configured to estimate an angle α between the reference vector 310 and the object vector 320. Also, the control unit 140 may be configured to determine the movement of the body section 104/camera 110 from the first position P1 into the second position P2 to be successful when the estimated angle α between the determined reference vector 310 and the determined object vector 320 is approximately zero. Further, the control unit 140 may be configured to determine the movement to be unsuccessful when the estimated angle α between the determined reference vector 310 and the determined object vector 320 is different from zero in addition to a reference limit. The control unit 140 may also be configured to determine the movement to be unconfirmed, otherwise, for example in case insufficient data or images of the reference objects 200a, 200b, 200c, 200d may be captured.

In some alternative embodiments, the control unit 140 may be configured to determine the reference value in form of coordinates, defining the position of the reference object 200a, 200b, 200c, 200d. Also, the control unit 140 may be configured to determine the current object value in form of coordinates, defining the position of the reference object 200a, 200b, 200c, 200d in the sampled image; and match the determined reference value with the current object value by a comparison between the coordinates of the reference object 200a, 200b, 200c, 200d.

The control unit 140 may also be configured to detect a plurality of reference objects 200a, 200b, 200c, 200d with the camera 110 situated in the first position P1. Also, the control unit 140 may be configured to capture a plurality of reference objects 200a, 200b, 200c, 200d in the sampled images. Furthermore, the control unit 140 may be configured to map the reference value with the current object value.

In some embodiments, the control unit 140 may be configured to trigger the maintenance measure when a measured time period between the requested movement and the start of the movement of the body section 104/camera 110 from the first position P1 exceeds an initiation reference time limit by the threshold limit.

The control unit 140 of the multibody system 100 may be configured to determine the reference value of the reference object 200a, 200b, 200c, 200d. Also, the control unit 140 may be configured to sample the image of the reference object 200a, 200b, 200c, 200d. The control unit 140 may furthermore be configured to determine the current object value of the reference object 200a, 200b, 200c, 200d, based on the sampled image. In addition, the control unit 140 may also be configured to match the determined reference value with the current object value when the reference object 200a, 200b, 200c, 200d comprises a moveable part of an animal 105.

The control unit 140 may comprise a receiver 610 configured for receiving information from the camera 110 via a wireless signal receiver and/or transceiver.

The control unit 140 comprises a processing circuitry 620 configured for performing various calculations and operations for conducting the method 500 according to at least some of the previously described steps 501-513, thereby determining successfulness of the movement of the body section 104/camera 110 from the first position P1 into the second position P2.

Such processing circuitry 620 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processing circuitry" may thus comprise a plurality of processing circuits, such as, e.g., any, some or all of the ones enumerated above.

Furthermore, the control unit 140 may comprise a memory 625 in some embodiments. The optional memory 625 may comprise a physical device utilised to store data or programs, i.e., sequences of instructions, on a temporary or permanent basis. According to some embodiments, the memory 625 may comprise integrated circuits comprising silicon-based transistors. The memory 625 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 140 may comprise a signal transmitter 630. The signal transmitter 630 may be configured for transmitting signals via a wired or wireless communication interface to the camera 110, the multibody system 100, the electronic device 160 and/or the database 150.

In some alternative embodiments, the multibody system 100 also may comprise an alerting device, configured to output an alert when the body section 104 comprising the camera 110 is determined to be dysfunctional. The alerting device may alert both animals 105 and farmers, discouraging them from approaching the body section 104, as it may result in a severe accident, also in case the emergency stop of the milking robot is triggered.

The multibody system 100 may furthermore comprise a database 150 configured to store reference values of the reference object 200a, 200b, 200c, 200d; and/or measured time values concerning the time it takes to move the body section 104/camera 110 from the first position P1 into the second position P2.

However, in some alternative embodiments, the multibody system 100 may also comprise additional units for performing the method 500 according to steps 501-513.

The above described steps 501-513 to be performed in the multibody system 100 may be implemented through the one or more processing circuitries 620 within the control unit 140, together with a computer program for performing at least some of the functions of the steps 501-513. Thus, the computer program comprises instructions which, when the computer program is executed by the control unit 140 in the multibody system 100, cause the control unit 140 to carry out the method 500 according to at least some of steps 501-513.

The computer program mentioned above may be provided for instance in the form of a computer-readable medium, i.e. a data carrier carrying computer program code for performing at least some of the steps 501-513 according to some embodiments when being loaded into the one or more processing circuitries 620 of the control unit 140. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 140 remotely, e.g. over an Internet or an intranet connection.

The terminology used in the description of the embodiments as illustrated in the accompanying drawings is not intended to be limiting of the described method 500; multibody system 100; control unit 140; computer program and/or computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware but may also be distributed in other forms such as via Internet or other wired or wireless communication system.

The invention claimed is:

1. A method for a multibody system including two body sections assembled via a joint, one of the body sections including a camera which is moveable between a first position and a second position, the method comprising:
    detecting at least one reference object with the camera situated in the first position;
    determining a reference value of the at least one reference object;
    requesting movement of the camera from the first position into the second position;
    initiating movement of the camera from the first position towards the second position, while iteratively
        sampling an image of the at least one reference object,
        determining a current object value of the at least one reference object, based on the sampled image, and
        matching the determined reference value with the determined current object value; and
    determining successfulness of the movement of the camera from the first position into the second position, based on the matching,
    wherein the determined reference value of the at least one reference object comprises a reference vector between a reference point of the multibody system and the position of the at least one reference object with the camera situated in the first position,
    the determined current object value of the at least one reference object, based on the sampled image comprises an object vector between the reference point of the multibody system and the at least one reference object in the sampled image, and
    the matching is made by a length comparison between the reference vector and the object vector.

2. The method according to claim 1, further comprising:
determining a status of the multibody system, based on the determined successfulness of the camera movement; and
outputting the determined status.

3. The method according to claim 1, further comprising:
measuring a time of the camera movement from the first position into the second position;
comparing the measured time with a reference time limit; and
triggering a maintenance measure when the measured time exceeds the reference time by a threshold limit.

4. The method according to claim 3, wherein the maintenance measure is triggered when a measured time period between the requested movement and the start of the movement of the camera from the first position exceeds an initiation reference time limit by the threshold limit.

5. The method according to claim 1, further comprising:
determining a successfulness rate of the camera movement, based on stored determined successfulness of the camera movement;
comparing the determined successfulness rate with a reference value; and
triggering a maintenance measure when the determined successfulness rate is lower than the reference value.

6. The method according to claim 1, further comprising estimating an angle between the reference vector and the object vector,
wherein the movement of the camera from the first position into the second position is determined to be one of:
(i) successful when the estimated angle between the determined reference vector and the determined object vector is approximately zero,
(ii) unsuccessful when the estimated angle between the determined reference vector and the determined object vector is different from zero in addition to a reference limit, and
(iii) unconfirmed when the movement is not determined to be successful and not determined to be unsuccessful.

7. The method according to claim 1, wherein the determined reference value of the at least one reference object and the current object value of the reference object comprise coordinates defining the position of the at least one reference object.

8. The method according to claim 1, wherein the at least one reference object comprises a plurality of reference objects,
the plurality of reference objects are detected with the camera situated in the first position,
the plurality of reference objects are captured in the sampled images, and
the matching comprises mapping the reference value with the current object value of each of the plurality of reference objects.

9. The method according to claim 1, wherein the reference object comprises a body part of an animal.

10. A non-transitory computer-readable medium on which is stored a computer program comprising instructions which cause the controller of the multibody system to carry out the method according to claim 1, when the computer program is executed by the controller in the multibody system.

11. A multibody system comprising:
two body sections assembled via a joint, one of the body sections comprising a camera which is moveable between a first position and a second position; and
a controller configured to
detect at least one reference object via the camera situated in the first position,
determine a reference value of the at least one reference object,
request movement of the camera from the first position into the second position,
initiate movement of the camera from the first position towards the second position, while iteratively
sampling an image of the at least one reference object,
determining a current object value of the at least one reference object, based on the sampled image, and
matching the determined reference value with the current object value, and
determine successfulness of the movement of the camera from the first position into the second position, based on the matching,
wherein the controller is further configured to:
determine a reference vector between a reference point of the multi-body system and the position of the at least one reference object with the camera situated in the first position,
determine an object vector between the reference point of the multi-body system the at least one reference object in the sampled image, and
match the determined reference value with the current object value by a length comparison between the determined reference vector and the determined object vector.

12. The multibody system acceding according to claim 11, wherein the controller is further configured to
determine a status of the multibody system, based on the determined successfulness of the camera movement, and
output the determined status.

13. The multibody system acceding according to claim 11, wherein the controller is further configured to:
measure a time of the camera movement from the first position into the second position,
compare the measured time with a reference time limit, and
trigger a maintenance measure when the measured time exceeds the reference time by a threshold limit.

14. The multibody system according to claim 13, wherein the controller is further configured to
trigger the maintenance measure when a measured time period between the requested movement and the start of the movement of the camera from the first position exceeds an initiation reference time limit by the threshold limit.

15. The multibody system according to claim 11, wherein the controller is further configured to:
determine a successfulness rate of the camera movement, based on stored determined successfulness of the camera movement,
compare the determined successfulness rate with a reference value, and
trigger a maintenance measure when the determined successfulness rate is lower than the reference value.

16. The multibody system according to claim 11, wherein the controller is configured to estimate an angle between the reference vector and the object vector, and
wherein the movement of the camera from the first position into the second position is determined to be one of:

(i) successful when the estimated angle between the determined reference vector and the determined object vector is approximately zero, (ii) unsuccessful when the estimated angle between the determined reference vector and the determined object vector is different from zero in addition to a reference limit, and (iii) unconfirmed when the movement is not determined to be successful and not determined to be unsuccessful.

17. The multibody system according to claim 11, wherein the controller is further configured to:

determine the reference value as coordinates, defining the position of the at least one reference object, determine the current object value as coordinates, defining the position of the at least one reference object in the sampled image, and match the determined reference value with the determined current object value by a comparison between the coordinates of the reference object.

18. The multibody system according to claim 11, wherein the at least one reference object comprises a plurality of reference objects, and wherein the controller is further configured to:

detect the plurality of reference objects with the camera situated in the first position, and capture the plurality of reference objects in the sampled images, and map the reference value with the current object value of each of the plurality of reference objects, to match the determined reference value with the determined current object value.

19. The multibody system according to claim 11, wherein the controller is further configured to determine the reference value of the at least one reference object, sample the image of the at least one reference object, determine the current object value of the at least one reference object, based on the sampled image, and match the determined reference value with the determined current object value when the at least one reference object comprises a body part of an animal.

* * * * *